(12) United States Patent
Jayasena

(10) Patent No.: US 11,868,254 B2
(45) Date of Patent: Jan. 9, 2024

(54) USING EPOCH COUNTER VALUES FOR CONTROLLING THE RETENTION OF CACHE BLOCKS IN A CACHE

(71) Applicant: Advanced Micro Devices, Inc., Santa Clara, CA (US)

(72) Inventor: Nuwan Jayasena, Cupertino, CA (US)

(73) Assignee: Advanced Micro Devices, Inc., Santa Clara, CA (US)

( * ) Notice: Subject to any disclaimer, the term of this patent is extended or adjusted under 35 U.S.C. 154(b) by 0 days.

(21) Appl. No.: 17/491,478

(22) Filed: Sep. 30, 2021

(65) Prior Publication Data

US 2023/0095461 A1 Mar. 30, 2023

(51) Int. Cl.
*G06F 12/08* (2016.01)
*G06F 12/0802* (2016.01)

(52) U.S. Cl.
CPC ...... *G06F 12/0802* (2013.01); *G06F 2212/60* (2013.01)

(58) Field of Classification Search
CPC .................. G06F 12/0802; G06F 2212/60
See application file for complete search history.

(56) References Cited

U.S. PATENT DOCUMENTS

2015/0212947 A1* 7/2015 Henry ............... G06F 9/50
711/119

* cited by examiner

*Primary Examiner* — Jae U Yu
(74) *Attorney, Agent, or Firm* — Park, Vaughan, Fleming & Dowler LLP

(57) ABSTRACT

An electronic device includes a cache, a memory, and a controller. The controller stores an epoch counter value in metadata for a location in the memory when a cache block evicted from the cache is stored in the location. The controller also controls how the cache block is retained in the cache based at least in part on the epoch counter value when the cache block is subsequently retrieved from the location and stored in the cache.

20 Claims, 7 Drawing Sheets

USING EPOCH COUNTER VALUES FOR CONTROLLING THE RETENTION OF CACHE BLOCKS IN A CACHE

BACKGROUND

Related Art

Some modern electronic devices include a processor (e.g., central processing units, graphics processing units, etc.) that executes program code (e.g., applications, operating systems, etc.) that causes the processor to perform corresponding operations. In many of these electronic devices, executing program code requires the processor to retrieve data from a non-volatile storage device such as a semiconductor memory or a hard disk ("data," as used here, is as a generic term that includes actual data, instructions, control values, etc.). Because retrieving data from a storage device takes a relatively long time, electronic devices often also include a memory, sometimes called a "main memory," into which copies of data are loaded from a storage device to enable more rapid retrieval of data by the processor. Although retrieving data from a memory is much faster than from a storage device, retrieving data from the memory takes a sufficiently long time that the processor can be forced to wait while data is returned from the memory. Electronic devices therefore often include at least one cache memory, or "cache," which is a smaller, fast access memory located on or near the processor that is used for locally storing copies of data for the processor. Because data can often be retrieved from the cache one or more orders of magnitude faster than retrieving the data from the memory, using the cache can improve the performance of the processor.

Because caches are relatively small and can only concurrently store a limited number of copies of data, or "cache blocks" (e.g., 64 byte cache lines with copies of data), it is common for caches to become full of cache blocks during operation. When a cache becomes full, to store any further cache blocks in the cache, existing cache blocks stored in the cache must be evicted (i.e., overwritten—and possibly written back to a lower level cache and/or to memory). Because decisions about which cache blocks are evicted can have an impact on the performance of the caches, caches are typically managed in accordance with retention policies. Retention policies include rules, specifications, and/or controls on which cache blocks are to be evicted/replaced in a cache. In other words, a retention policy dictates which existing cache blocks are to be removed from a cache to free space for storing incoming cache blocks. For example, one such retention policy is a "recently used" retention policy. For a simple version of the recently used retention policy, cache blocks that have been more recently used/accessed are preferentially retained in caches. In accordance with this retention policy, therefore, when determining which of two or more cache blocks are to be evicted from a cache, a cache controller checks information about recency of accesses associated with each of the cache blocks and evicts a cache block for which it has been the longest time since the cache block was last accessed. Although retention policies typically offer better cache performance than randomly evicting cache blocks, retention policies only consider limited information for eviction decisions and may therefore result in less than optimal retention of cache blocks.

BRIEF DESCRIPTION OF THE FIGURES

Throughout the figures and the description, like reference numerals refer to the same figure elements.

DETAILED DESCRIPTION

Figure 1:
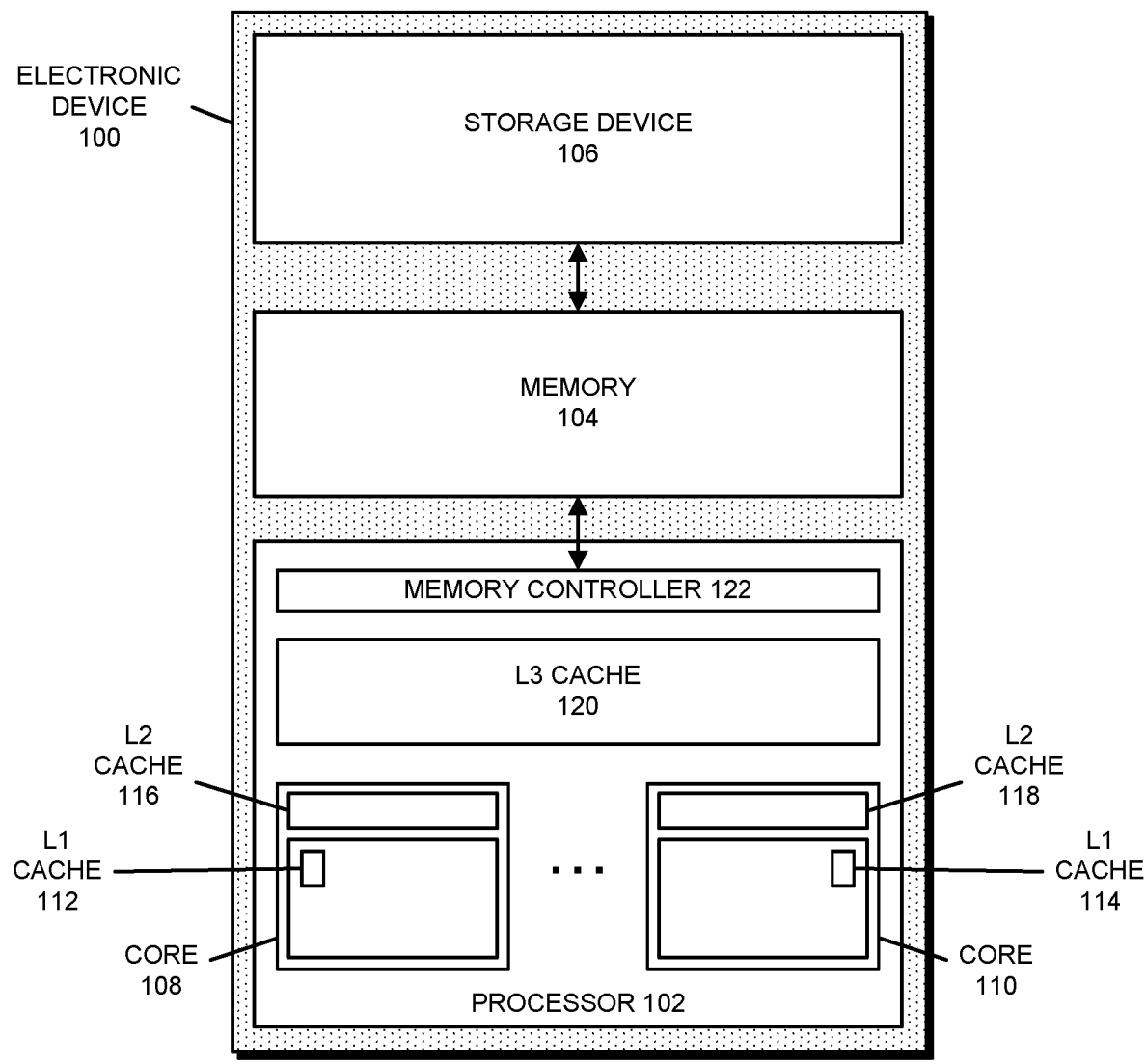
FIG. 1 presents a block diagram illustrating an electronic device in accordance with some embodiments.

The following description is presented to enable any person skilled in the art to make and use the described embodiments and is provided in the context of a particular application and its requirements. Various modifications to the described embodiments will be readily apparent to those skilled in the art, and the general principles described herein may be applied to other embodiments and applications. Thus, the described embodiments are not limited to the embodiments shown, but are to be accorded the widest scope consistent with the principles and features described herein.

Terminology

In the following description, various terms are used for describing embodiments. The following is a simplified and general description of some of the terms. Note that these terms may have significant additional aspects that are not recited herein for clarity and brevity and thus the description is not intended to limit these terms.

Functional block: functional block refers to a set of interrelated circuitry such as integrated circuit circuitry, discrete circuitry, etc. The circuitry is "interrelated" in that circuit elements in the circuitry share at least one property. For example, the circuitry may be included in, fabricated on, or otherwise coupled to a particular integrated circuit chip, substrate, circuit board, or portion thereof, may be involved in the performance of specified operations (e.g., computational operations, control operations, memory operations, etc.), may be controlled by a common control element and/or a common clock, etc. The circuitry in a functional block can have any number of circuit elements, from a single circuit element (e.g., a single integrated circuit logic gate or discrete circuit element) to millions or billions of circuit elements (e.g., an integrated circuit memory). In some embodiments, functional blocks perform operations "in hardware," using circuitry that performs the operations without executing program code.

Data: data is a generic term that indicates information that can be stored in memories and/or used in computational, control, and/or other operations. Data includes information such as actual data (e.g., results of computational or control operations, outputs of processing circuitry, inputs for computational or control operations, variable values, sensor values, etc.), files, program code instructions, control values, variables, and/or other information.

Memory accesses: memory accesses, or, more simply, accesses, include interactions that can be performed for, on, using, and/or with data stored in memory. For example, accesses can include writes or stores of data to memory, reads of data in memory, invalidations or deletions of data in memory, moves of data in memory, writes or stores to metadata associated with data in memory, etc. In some cases, copies of data are accessed in a cache and accessing the copies of the data can include interactions that can be performed for, on, using, and/or with the copies of the data stored in the cache (such as those described above), along with cache-specific interactions such as updating coherence or access permission information, etc.

Overview

In the described embodiments, an electronic device includes a processor that executes program code (e.g., applications, operating systems, etc.) to cause the processor to perform corresponding operations. The electronic device also includes a memory (e.g., a main memory) in which copies of data are stored so that the copies of data can be retrieved for use in executing program code and other operations in the processor. The electronic device additionally includes one or more cache memories, or "caches," which are fast-access memories in which copies of data acquired from the memory, or "cache blocks" (e.g., 64 byte cache lines or combinations or portions thereof), are stored to enable more rapid accesses of the cache blocks.

In the described embodiments, a controller in the electronic device (e.g., a memory controller, a cache controller, an in-memory controller, etc.) keeps track of reload times for cache blocks using epoch counter values. Generally, a reload time is the time between when a cache block evicted from a cache is stored in the memory and when the cache block is subsequently reloaded from the memory to the cache. The controller performs operations for controlling (or influencing) how cache blocks are retained in the cache based on reload times computed using corresponding epoch counter values. For example, the controller may cause the cache to configure cache blocks with shorter reload times (i.e., that have been more rapidly reloaded to the cache from the memory) to be more likely to be retained in the cache or cause the cache to configure cache blocks with longer reload times to be less likely to be retained in the cache. In other words, when a cache block has been reloaded from the memory to the cache relatively soon after being evicted, the controller can cause the cache to configure the cache block to be more likely to be kept in the cache—or vice versa.

In some embodiments, for using the reload times for controlling (or influencing) how cache blocks are retained in the cache, the controller keeps an epoch counter (e.g., an N-bit counter, where N=4, 8, or another number) that is advanced to a next counter value at the completion of each epoch. When a cache block evicted from the cache is stored in a location in the memory, the controller reads a value of the epoch counter and stores the epoch counter value in metadata for the location in the memory. For example, in some embodiments, the controller stores the epoch counter value in some or all of a set of bits in the metadata that were historically included for storing error correction code (ECC) information, but that are being extended or repurposed for storing the epoch counter value. By storing the epoch counter value in the metadata, the controller records an epoch from a sequence of epochs in which the copy of the cache block was stored in the location in the memory. Upon subsequently retrieving a copy of the cache block from the location and storing the copy of the cache block in the cache (i.e., reloading the cache block to the cache), the controller acquires the epoch counter value from the metadata and uses the epoch counter value from the metadata to determine the reload time for the cache block. For example, the controller can compute the reload time as a difference between the epoch counter value from the metadata and a current value of the epoch counter. The controller next uses the reload time to control (or influence) how the cache block is retained in the cache as described above.

In some embodiments, the controller employs mechanisms of one or more retention policies in use in a cache for controlling (or influencing) how cache blocks are retained in the cache based on reload times. Generally, a retention policy includes rules, guidelines, specifications, and/or controls on which cache blocks are to be retained in a cache—or evicted from the cache. The particular operations performed by the controller for controlling (or influencing) how cache blocks are retained in the cache therefore depends on the one or more retention policies that are being used in the cache. For example, in some embodiments, a retention policy in use in a cache is a "recently used" retention policy under which less recently used cache blocks are preferentially evicted from the cache and more recently used cache blocks are preferentially retained in the cache. In these embodiments, cache blocks are associated with usage information that is used for determining the relative usage times of two or more cache blocks (e.g., of cache blocks in ways in a set in a set associative cache). In accordance with the recently used retention policy, configuring a cache block to be more likely to be retained in the cache includes setting usage information for the cache block to identify the cache block as more recently used (e.g., setting the cache block to a most recently used, or MRU, status). In contrast, configuring a cache block to be less likely to be retained in the cache includes setting usage information for the cache block to identify the cache block as least recently used (or not as most recently used).

In some embodiments, for periodically advancing the epoch counter value to a next counter value as described above, the controller increases or otherwise updates the epoch counter at one or more specified times. For example, the controller may increment the epoch counter every K μs (where K=500, 250, or another number). As another example, the controller may increase the epoch counter every W memory reads or cache line evictions (W=300, 1000, or another number). In some embodiments, the epoch counter is stored in a limited number of bits, e.g., the above-described N bits. In these embodiments, upon advancing the epoch counter to a highest allowable value for the bits, the epoch counter "rolls over," so that the next advancement in the epoch counter returns the epoch counter to an initial value. For example, for a two bit epoch counter, the epoch counter may roll over from 11 to 00. Alternatively, the epoch counter may roll over to a different initial value, such as to 01, should the 00 value be reserved for another purpose (e.g., where the 00 value is reserved for indicating an invalid epoch counter, etc.). In some of these embodiments, a rate at which the epoch counter is advanced (in terms of an amount of time between advancements, etc.) is selected based on a specified amount of time between consecutive rollovers for the epoch counter. In other words, the rate at which the epoch counter is advanced is set so that the epoch counter rolls over at a desired rate.

In some embodiments, when the epoch counter rolls over or reaches a specified pre-rollover value, the controller (or another entity) resets some or all existing epoch counter values in metadata for locations in the memory to an invalid value—thereby invalidating these existing epoch counter values. For example, assuming a two bit epoch counter, if 00 is a value representing an invalid epoch counter, the controller can reset the epoch counter values in metadata to 00. In these embodiments, the epoch values are reset in this way in order to avoid incorrect computations of reload time that may occur based on pre-rollover stored epoch counter values in metadata.

In some embodiments, the use of the epoch counter values to control (or influence) how cache blocks are retained in a cache can be enabled or disabled/halted for specified cache blocks (e.g., for individual cache blocks, groups of cache blocks, and/or all cache blocks). For example, in some embodiments, when a cache block is accessed while stored in the cache, the use of the epoch counter values to control (or influence) the retention of the cache block is halted (and the cache block is subsequently managed based on a retention policy for the cache). As another example, in some embodiments, the controller can entirely disable the use of the epoch counter values for controlling (or influencing) how cache lines are retained in the cache. For instance, the controller (or another entity) may monitor evictions of cache blocks and turn off (or turn on) the use of the epoch counter values when specified cache performance threshold values are not met.

In some embodiments, the above-described operations are performed only for cache lines that are written back to memory, as can be done for dirty cache blocks with modified data that does not match memory. In other words, the described embodiments employ the write of the cache blocks back to memory for writing epoch values to metadata. In some embodiments, however, upon evicting "clean" data from the cache (i.e., simply overwriting data in the cache that does not need to be written back to memory), the controller reads a value of the epoch counter and stores the epoch counter value in metadata for a location in the memory associated with the clean cache block. The epoch counter values can then also be used for the clean evicted cache blocks.

By using epoch counter values as described above, the described embodiments can simply and efficiently track and compute reload times to be used for controlling (or influencing) the retention of cache blocks in the cache. This can help to ensure both that: (1) cache blocks that are likely to be more useful (based on shorter reload times) remain in the cache and (2) cache blocks with longer reload times are more readily evicted from the cache. By storing the epoch values in repurposed metadata bits for locations in the memory, the described embodiments avoid the need for complex and large (in terms of semiconductor layout, etc.) separate mechanisms for tracking reload times—and also enable the rapid retrieval of the epoch values (e.g., in single row buffer reads in memory circuitry, etc.). By working with retention policies in use in the cache for controlling (or influencing) the retention of cache blocks, the described embodiments avoid the need for complex control circuitry/ logic in the controller and/or the cache. Overall, using epoch counter values to control (or influence) how cache blocks are retained in cache memories leads to better performance for the cache memories in the form of improved cache accuracy of block retention, the memory in the form of fewer memory accesses for cache blocks, and the processor in the form of more useful data being available in the cache. The improvement of each of these elements improves the overall performance of the electronic device, which increases user satisfaction with the electronic device.

Electronic Device

FIG. 1 presents a block diagram illustrating electronic device 100 in accordance with some embodiments. As can be seen in FIG. 1, electronic device 100 includes processor 102, memory 104, and storage device 106. Processor 102, memory 104, and storage device 106 are all implemented in hardware, i.e., using corresponding integrated circuitry, discrete circuitry, and/or devices. For example, in some embodiments, processor 102, memory 104, and storage device 106 are implemented in integrated circuitry on one or more semiconductor chips, are implemented in a combination of integrated circuitry on one or more semiconductor chips in combination with discrete circuitry and/or devices, or are implemented in discrete circuitry and/or devices.

In the described embodiments, processor 102 and memory 104 perform operations for using epoch counter values stored in metadata for locations in memory 104 for controlling (or influencing) how cache blocks are retained in a cache (e.g., L3 cache 120, etc.). In some embodiments, processor 102 and memory 104 perform the operations in hardware, i.e., using circuitry having integrated circuits, discrete circuit elements, and/or devices that perform respective parts of the operations.

Processor 102 is a functional block that performs computational, memory access, control, and/or other operations. For example, processor 102 can be a central processing unit (CPU), a graphics processing unit (GPU), an accelerated processing unit (APU), a system on a chip (SOC), a field programmable gate array (FPGA), etc. Processor 102 includes a number of cores 108-110. Each of cores 108-110 is a separate functional block that performs computational, memory access, control, and/or other operations. For example, in some embodiments, each of cores 108-110 is or includes a central processing unit (CPU) core, a graphics processing unit (GPU) core, an embedded processor, an application specific integrated circuit (ASIC), a microcontroller, and/or another functional block.

Memory 104 is a functional block that stores data for other functional blocks in electronic device 100. For example, in some embodiments, memory 104 is a higher capacity integrated circuit memory into which copies of data retrieved from storage device 106 (e.g., 4 kB pages of data) are stored for subsequent accesses by the other functional blocks (e.g., cores 108-110, etc.). Memory 104 includes memory circuitry such as double data rate synchronous dynamic random-access memory (DDR SDRAM) and/or other types of memory circuits, as well as control circuits for handling accesses of the data stored in the memory circuits.

Storage device 106 is a functional block, device, and/or element including a non-volatile memory for storing data for use by other functional blocks in electronic device 100. For example, storage device 106 can be or include one or more non-volatile semiconductor memories, hard disks, optical disks, magnetic tapes, etc. As described above, data is retrieved from storage device 106 and stored in memory 104 for access by the other functional blocks (e.g., cores 108-110).

Returning to processor 102, processor 102 includes cache memories, or "caches," which are functional blocks that are used for storing copies of data that can be used by cores 108-110 for performing various operations. For example, the caches can be used to store cache blocks such as P-byte cache lines (or combinations or portions of cache lines) that include copies of data retrieved from memory 104 and/or storage device 106 (P=64, 128, or another number). As can be seen in FIG. 1, the caches include level one caches 112-114 (L1 CACHE 112 and L1 CACHE 114) and level two caches (L2 CACHE 116 and L2 CACHE 118) in cores 108-110, respectively. Each of L1 caches 112-114 and L2 caches 116-118 includes memory circuitry for storing cache blocks with copies of data and control circuitry for handling accesses of data stored in the memory circuitry. The caches also include a level three cache (L3 CACHE 120) that includes memory circuitry for storing cache blocks with copies of data and control circuitry for handling accesses of data stored in the memory circuitry. In some embodiments, L3 cache 120 is shared by cores 108-110 and therefore can be used for storing copies of data for both cores 108-110. In some embodiments, the caches are arranged in a hierarchy, with smaller and faster-access caches higher in the hierarchy. For example, in some embodiments, the highest caches in the hierarchy, L1 caches 112-114, are 64 KiB and are the fastest to access, L2 caches 116-118 are 512 KiB and are accessed at an intermediate speed, and the lowest cache in the hierarchy, L3 cache 120, is 32 MiB and is the slowest to access. In some embodiments, L1 caches 112-114 are split into separate data and instruction caches.

Processor 102 also includes memory controller 122, which is a functional block that performs operations for interfacing between processor 102 and memory 104. Memory controller 122 performs operations such as synchronizing memory accesses, detecting and avoiding conflicts between memory accesses, directing data accessed during memory accesses to or from particular functional blocks in electronic device 100 (e.g., cores 108-110), etc.

In some embodiments, memory controller 122 keeps an epoch counter and performs at least some of the operations for using epoch counter values for controlling (or influencing) how cache blocks are retained in a cache. In other embodiments, however, a different functional block performs some or all of these operations. For example, in some embodiments, a controller in memory 104, core 108 and/or 110, or elsewhere in electronic device 100 performs some or all of the operations for keeping an epoch counter and using epoch counter values for controlling (or influencing) how cache blocks are retained in a cache. Generally, there is at least one functional block—which is generically called a "controller" herein—that includes circuitry that performs some or all of the operations for keeping an epoch counter and using epoch counter values for controlling (or influencing) how cache blocks are retained in a cache.

Although electronic device 100 is shown in FIG. 1 with a particular number and arrangement of functional blocks and devices, in some embodiments, electronic device 100 includes different numbers and/or arrangements of functional blocks and devices. For example, in some embodiments, electronic device 100 includes a different number of processors. In addition, although processor 102 is shown with a given number and arrangement of functional blocks, in some embodiments, processor 102 includes a different number and/or arrangement of functional blocks. For example, in some embodiments, processor 102 includes a different number of cores and/or a different number and/or arrangement of cache memories. Generally, in the described embodiments, electronic device 100 and processor 102 include sufficient numbers and/or arrangements of functional blocks to perform the operations herein described.

Electronic device 100 as shown in FIG. 1 is simplified for illustrative purposes. In some embodiments, however, electronic device 100 includes additional or different elements and mechanisms for performing the operations herein described and other operations. For example, electronic device 100 can include electrical power functional blocks or devices, human interface functional blocks or devices (e.g., displays, touch sensitive input elements, speakers, etc.), input-output functional blocks or devices, etc.

Electronic device 100 can be, or can be included in, any electronic device that performs computational and memory access operations. For example, electronic device 100 can be, or can be included in, desktop computers, laptop computers, wearable electronic devices, tablet computers, smart phones, servers, artificial intelligence apparatuses, virtual or augmented reality equipment, network appliances, toys, audio-visual equipment, home appliances, controllers, vehicles, etc., and/or combinations thereof. In some embodiments, electronic device 100 is included on one or more semiconductor chips. For example, in some embodiments, electronic device 100 is entirely included in a single "system on a chip" (SOC) semiconductor chip, is included on one or more ASICs, etc.

Metadata for Locations in a Memory

Figure 2:
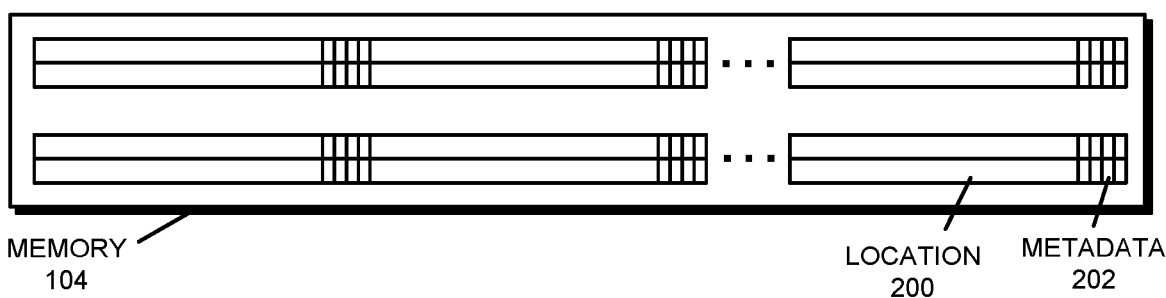
FIG. 2 presents a block diagram illustrating a memory in accordance with some embodiments.

In the described embodiments, a memory includes a number of locations for storing data along with metadata for the locations. FIG. 2 presents a block diagram illustrating a memory 104 in accordance with some embodiments. As can be seen in FIG. 2, memory 104 includes a number of locations, each location including memory circuitry for storing a given number of bytes of data (only one location is labeled location 200 in FIG. 2 for clarity). For example, in some embodiments, each location includes memory circuitry for storing a 64 B cache block. Memory 104 also includes metadata for each location that is to be used for storing metadata for the associated location (the metadata for only one location is labeled metadata 202 in FIG. 2 for clarity).

In the described embodiments, at least some of the metadata, i.e., at least some of the bits of metadata, is originally intended for the purpose of storing error correction code (ECC) bits. The ECC bits are a separate set of H bits (H=32, 40, or another number) that could be used for correcting bit faults or errors in data stored in the memory. For example, the ECC bits could store ECC information for correcting a single bit error and detecting two bit errors in data stored in an associated location. Because more efficient ECC schemes may be used for locations in memory 104 (e.g., simply detecting an error, but not correcting the error), additional metadata bits may be provisioned for error correction internally to memory 104 that are not exposed to a processor (e.g., processor 102) attached to memory 104, or metadata-based ECC may not be used, some or all of the ECC bits are not needed for storing ECC information. Alternatively, in some embodiments, additional metadata bits beyond what is needed for ECC are provisioned for locations in memory 104. There are therefore surplus ECC bits available in the metadata. In the described embodiments, some or all of the surplus ECC bits are repurposed for storing an epoch counter for data in the associated location. For example, assuming that there are H ECC bits in the metadata, but K of the ECC bits are used for storing ECC information, there are up to XECC bits that can be repurposed for storing an epoch counter (where H=32, 24, or another number and K=0, 12, or another number, and X=H−K).

In some embodiments, the memory circuitry in memory 104 is arranged in a set of rows, each row including a number of locations and the corresponding metadata. In some of these embodiments, some or all of each row can be read into a row buffer in memory in a single memory circuitry read operation—and cache blocks (e.g., 64 byte cache blocks in each location) and the associated metadata can be acquired from the row buffer to be provided to a processor (e.g., processor 102). For example, in some embodiments, assuming that memory 104 is implemented in DRAM, an 8 KiB row of memory that includes multiple locations (with each location capable of storing a 64 B cache block) and the associated metadata can be read into a DRAM row buffer in a single read operation.

Storing a Cache Block Evicted from a Cache into a Memory

Figure 3:
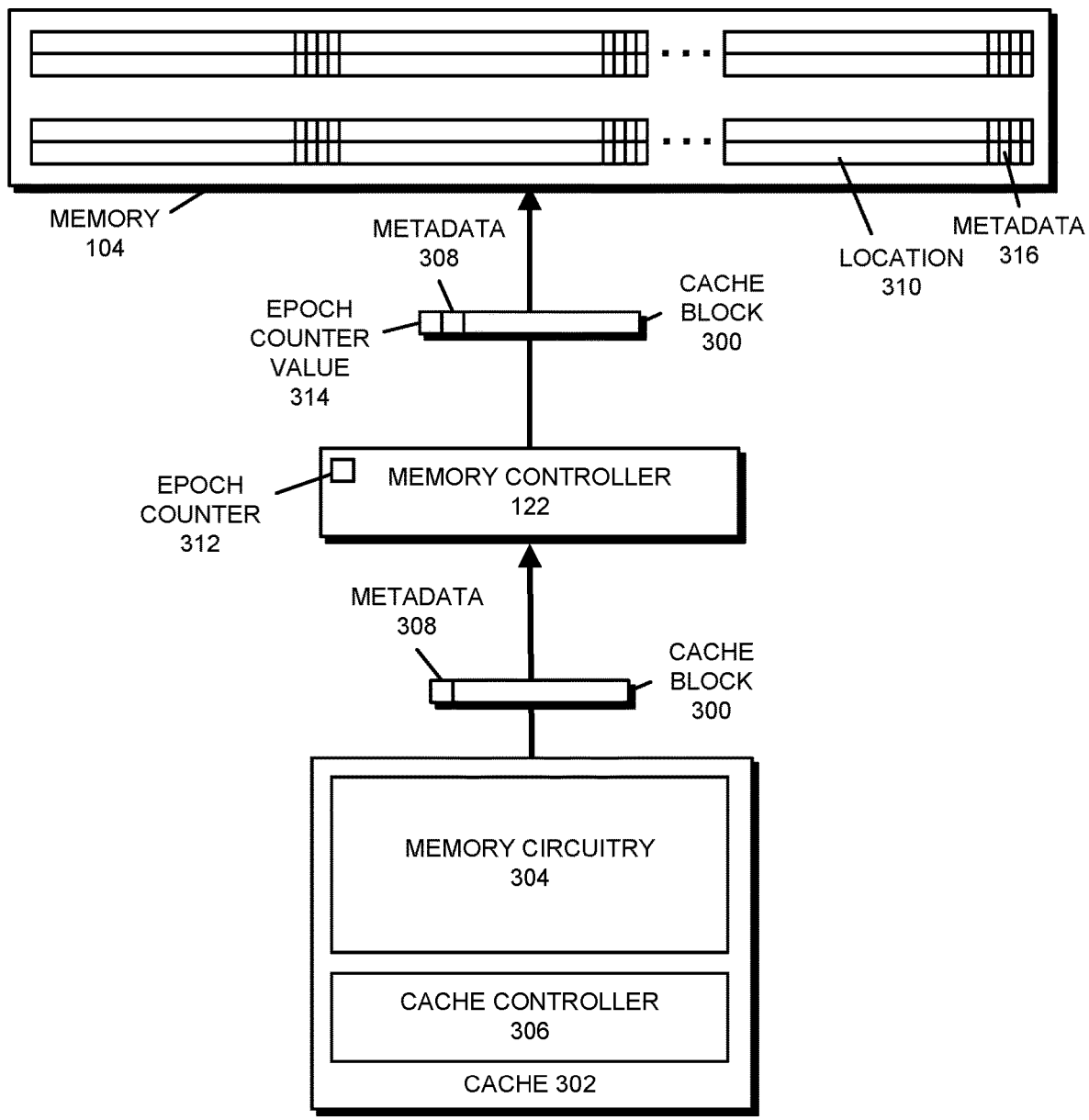
FIG. 3 presents a block diagram illustrating storing a cache block evicted from a cache in a location in a memory and storing an epoch counter value in metadata for the location in the memory in accordance with some embodiments.

In some embodiments, when storing a cache block evicted from a cache in a location in a memory, a memory controller also stores an epoch counter value in metadata for the location in the memory. Generally, the epoch counter value is stored in the memory in order to record information identifying when—i.e., during which epoch in a sequence of epochs—the cache block was stored in the location in memory. FIG. 3 presents a block diagram illustrating storing a cache block evicted from a cache in a location in a memory and storing an epoch counter value in metadata for the location in memory in accordance with some embodiments.

For the example in FIG. 3, it is assumed that cache block 300 is initially stored in cache 302 (which can be L3 cache 120 or another of the caches in electronic device 100). In other words, a cache block 300 that includes an N-byte cache line, or a portion or combination of one or more N-byte cache lines, with a copy of data originally acquired from memory was earlier stored in memory circuitry 304 in cache 302 (N=48, 64, or another number). It is also assumed that cache controller 306 has determined that cache block 300 is to be evicted, e.g., for freeing space for an incoming cache block. For example, in accordance with a retention policy in use in cache 302, cache controller 306 can analyze cache blocks stored in memory circuitry 304 and determine that cache block 300 is to be evicted. It is further assumed that cache block 300 is to be written back to memory 104. For example, cache block 300 can include the only copy of certain data or a copy of data that is different than the corresponding data stored in memory 104 (e.g., modified data, etc.).

For the example in FIG. 3, memory controller 122 (and/or another entity) keeps epoch counter 312 in a local, and possibly dedicated, storage element (e.g., register, memory circuitry, etc.). Generally, epoch counter 312 is a W-bit value used as a record of the passage of time, the occurrence of specified events, and/or other progress in epochs in electronic device 100 (W=4, 8, or another value). Upon progressing through a given epoch, memory controller 122 advances the epoch counter to a next value for the epoch counter in order to record a transition to a next epoch. For example, in some embodiments, epoch counter 312 is a record of the progress of time and memory controller 122 advances epoch counter 312 every T μs (T=100, 500, or another number). In these embodiments, each value of the epoch counter identifies a respective epoch of time (i.e., window, portion, block, etc.). For instance, assuming a two-bit epoch counter in which the 00 value represents an invalid epoch counter, the values 01, 10, and 11 identify three separate epochs, and thus windows of time, in a sequence of epochs. As another example, in some embodiments, epoch counter 312 is a record of the occurrence of specified events and memory controller 122 advances epoch counter 312 upon the occurrence of a given number of the specified events. For instance, the events may be evictions of cache blocks, memory accesses, etc. In these embodiments, each value of the epoch counter identifies a respective epoch of events (i.e., set, group, block, etc.).

As can be seen via the arrow between cache 302 and memory controller 122, cache controller 306 sends a request to memory controller 122 to write cache block 300 and corresponding metadata 308 (e.g., ECC information, etc.) to memory 104. Memory controller 122 receives the request and commences operations for writing cache block 300 and metadata 308 back to memory. As part of these operations, memory controller 122 generates a write request for writing cache block 300 to a location 310 in memory 104 and metadata 316 to metadata for the location 310. For example, in some embodiments, memory 104 includes DRAM memory circuitry and memory controller 122 prepares a DRAM write request for writing cache block 300 and metadata 308 to memory 104. As another part of the operations, memory controller 122 acquires a current value of epoch counter 312. In other words, memory controller 122 reads epoch counter 312's value at the time when the write request is being prepared—and epoch counter 312 identifies a present epoch. As can be seen via the arrow between memory controller 122 and memory 104, memory controller 122 includes the current value of the epoch counter in the write request—as epoch counter value 314—along with cache block 300 and metadata 308. In this way, memory controller 122 includes, in the write request, information about the epoch in which cache block 300 was evicted so that a record of the epoch can be kept with the cache block 300. Cache controller 306 then sends the completed write request to memory controller 122.

Figure 4:
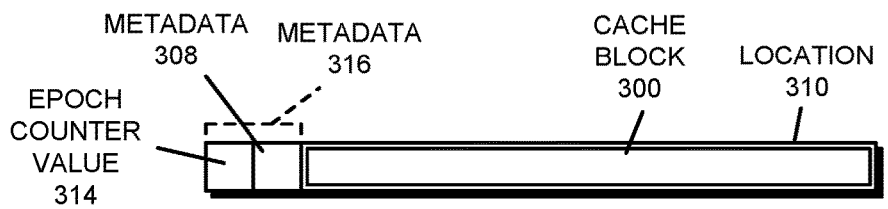
FIG. 4 presents a block diagram illustrating a cache block stored in a location in a memory and an epoch counter value stored in metadata for the location in the memory in accordance with some embodiments.

Upon receiving the write request, memory 104 writes cache block 300 to location 310 in memory 104. In other words, memory 104, based on a memory address associated with cache block 300, stores cache block 300 in location 310. Memory 104 also writes metadata 308 and epoch counter value 314 to metadata 316 for location 310. For this operation, in some embodiments, memory 104 stores epoch counter value 314 (e.g., N bits), or some value computed or generated therefrom, in repurposed ECC bits in metadata 316 as described above. Following the write operation, cache block 300 is stored in location 310, and metadata 308 and epoch counter value 314 are stored in metadata 316. FIG. 4 presents a block diagram illustrating cache block 300 and epoch counter value 314 stored in location 310 and metadata 316 in accordance with some embodiments. As can be seen in FIG. 4, epoch counter value 314 is stored in metadata 316, as is metadata 308. Cache block 300 is also stored in location 310.

Although an example of storing an epoch counter value in metadata for a location is presented in FIG. 4, in some embodiments, some or all of the operations are performed differently and/or by other functional blocks. For example, although metadata 308 is shown as being included in data written back to memory, in some embodiments, metadata 308 is not included (or is included, but used and discarded—and not stored in memory). As another example, although epoch counter value 314 is shown as being included in a write request to memory 104, in some embodiments, epoch counter value 314 is provided to memory 104 in a different way, such as via dedicated signal lines, a sideband channel, in a separate write request or control request to memory 104, etc. As another example, in some embodiments, a controller other than memory controller 122 performs some or all of the operations. Generally, in the described embodiments, a current epoch counter value 314 is stored in metadata 316 when an evicted cache block 300 is stored in the associated location in memory.

Loading a Cache Block from a Memory to a Cache

Figure 5:
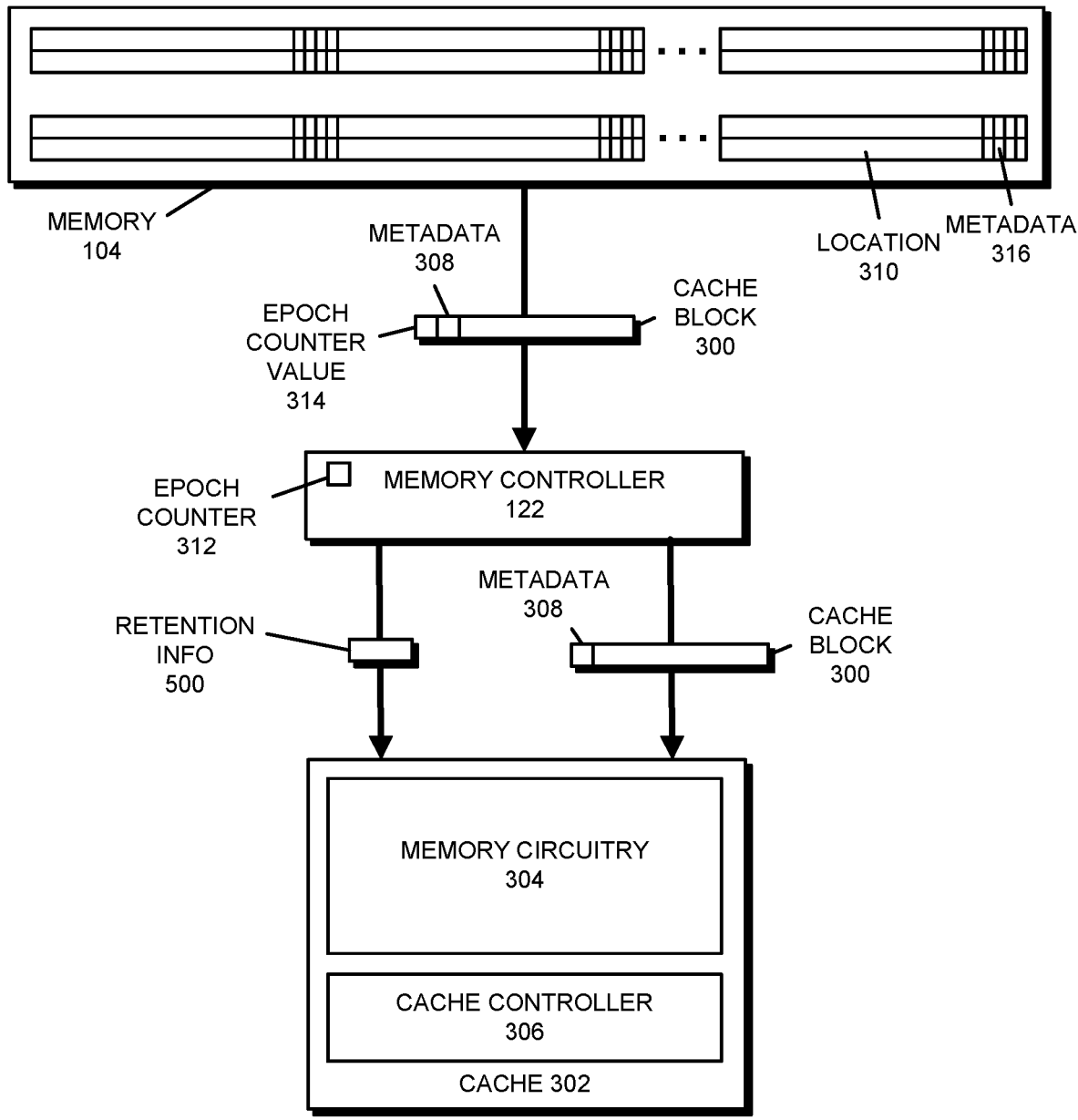
FIG. 5 presents a block diagram illustrating loading a cache block from a memory to a cache and using an epoch counter value for controlling how the cache block is retained in a cache in accordance with some embodiments.

In some embodiments, when loading a cache block from a location in memory to a cache, a memory controller acquires an epoch counter value from metadata for the location in the memory and uses the epoch counter value to control (or influence) how the cache block is retained in the cache. That is, the memory controller uses the epoch counter value to determine a reload time for the cache block and performs operations for configuring the retention of the cache block in the cache based on the reload time. FIG. 5 presents a block diagram illustrating loading a cache block from a memory to a cache and using an epoch counter value for controlling (or influencing) how the cache block is retained in a cache in accordance with some embodiments.

For the example in FIG. 5, it is assumed that the operations of FIG. 3 were previously performed. A cache block 300 is therefore stored in location 310 in memory 104 and metadata 308 and an epoch counter value 314 are stored in metadata 316 for location 310. As described for FIG. 3, the stored epoch counter value 314 identifies an epoch during which the cache block was evicted from cache 302. It is further assumed that memory 104 has received a request to load cache block 300 to cache 302 (e.g., received the request from cache 302 via memory controller 122).

As can be seen via the arrow between memory 104 and memory controller 122, memory 104 sends cache block 300, metadata 308, and epoch counter value 314 to memory controller 122 in response to the above-described request. For this operation, memory 104 retrieves a copy of cache block 300 from location 310 and retrieves copies of metadata 308 and epoch counter value 314 from metadata 316 and generates a read response therefrom. Memory 104 then returns the read response including cache block 300, metadata 308, and epoch counter value 314 to memory controller 122.

Upon receiving the read response, memory controller 122 uses epoch counter value 314 to determine how cache block 300 is to be retained in cache 302. For example, in some embodiments, memory controller 122 computes a difference between a current value of epoch counter 312 and epoch counter value 314. Memory controller 122 then compares the difference to one or more thresholds to determine whether cache block 300 is to be configured to be more likely (or less likely) to be retained in cache 302. For example, in some embodiments, when the difference is smaller than a given threshold value, memory controller 122 determines that cache block 300 is to be configured so that cache block 300 is more likely to be retained in cache 302. In other words, when a reload time for cache block 300, as represented by the difference, is less than the threshold value, and thus cache block 300 has been relatively rapidly reloaded from memory 104 to cache 302, memory controller 122 determines that cache block 300 is more likely to be rapidly reused and should be configured to reside for longer in cache 302. In contrast, when the difference is larger than the given threshold value, memory controller 122 determines that cache block 300 is to be configured so that cache block 300 is less likely to be retained in cache 302. In other words, when the reload time, as represented by the difference, is greater than the threshold value, and thus cache block 300 has been relatively slowly reloaded from memory 104 to cache 302, memory controller 122 determines that cache block 300 is less likely to be rapidly reused and should be configured to reside for a shorter time in cache 302.

Note that the above-described determinations of the likelihood (or not) of reuse are estimates or predictions made by memory controller 122, as the future behavior of cache block 300 in cache 302 is unknown. The estimates, however, reflect relatively recent past behavior of cache block 300 in cache 302—and this behavior has been found to be generally useful/correct for the purpose of controlling (or influencing) the retention of cache blocks in caches as described herein. Despite the use of estimates, it should also be noted, correct operation of the system is not threatened—although in a relatively small percentage of cases, inefficient operation can occur due to incorrectly controlling (or influencing) the retention of (or eviction of) cache blocks in cache 302.

In some embodiments, the above-described threshold value is static and is therefore set prior to use and retained at a given value while memory controller 122 (and electronic device 100) operate. For example, in some embodiments, assuming that epochs are measured using the passage of time, then the threshold value can be statically set to a given time. In other embodiments, however, the threshold value is dynamic and is set/reset based on one or more operational metrics. For example, in some embodiments, memory controller 122 (or another entity) monitors reload times for cache blocks and sets the threshold based on an average reload time for cache blocks.

Returning to FIG. 5, memory controller 122 then sends cache block 300 and metadata 308 to cache 302 along with retention information (INFO) 500. Generally, retention information 500 identifies how cache block 300 is to be retained in cache 302. Retention information 500 therefore includes or represents a value that can be used by cache 302 (e.g., by cache controller 306) for determining one or more retention settings for cache block 300. For example, in some embodiments, retention information 500 includes a number of bits, each of which identifies a corresponding retention value or range for cache block 300. For instance, retention information 500 may be a single bit, with a low logical or deasserted value identifying that cache block 300 is to be configured as less likely to be retained in cache 302 and a high logical or asserted value identifying that cache block 300 is to be configured as more likely to be retained in cache 302.

Upon receiving cache block 300, metadata 308, and retention information 500, cache 302 stores cache block 300 and metadata 308. For example, in some embodiments, cache 302 is set associative and cache controller 306 determines a way for a set into which cache block 300 and metadata 308 are to be stored (which can involve evicting an existing cache block). Cache 302 also configures cache block 300 to be retained in cache 302 based at least in part on retention information 500 (cache 302 may also use other factors, values, inputs, etc. for configuring the retention of cache block 300). For example, cache 302 may set identifiers, indicators, tag values, metadata values, etc. used for a retention policy so that cache block 300 is retained in cache 302. For instance, if the retention policy is a recently used retention policy, cache 302 can set a recently used identifier for cache block 300 to most recently used (when cache block 300 is to be configured to be more likely to be retained in cache 302) or less recently used. Epoch counter value 314 is therefore used to "control (or influence)" the retention of cache block 300 in cache 302 by dictating—or at least suggesting—to cache 302 via retention information 500, retention policy settings for cache block 300. In other words, the retention of cache block 300 can be controlled based at least in part on epoch counter value 314 and one or more other factors (e.g., factors associated with a retention policy in use in the cache, factors received or acquired from other entities, etc.). Note that, in some embodiments, metadata 308 associated with the cache block 300 may be used at memory controller 122 or cache 302 for error checking or other purposes and may be discarded (i.e., not communicated to and/or stored in the cache 302).

Note that, as used herein, the relative term "more likely" to be retained in the cache is intended to indicate that cache blocks configured in this way have a better chance of remaining in the cache in accordance with a retention policy in use in the cache (when compared to other cache blocks in the cache). In addition, as used herein, the relative term "less likely" to be retained in the cache is intended to indicate that cache blocks configured in this way have a worse chance of remaining in the cache in accordance with a retention policy in use in the cache (when compared to other cache blocks in the cache).

Although an example of loading a cache block and using an epoch counter value to control (or influence) retention of the cache block in a cache is presented in FIG. 5, in some embodiments, some or all of the operations are performed differently and/or by other functional blocks. For example, although epoch counter value 314 is shown as being included in a read response, in some embodiments, epoch counter value 314 is provided to the memory controller in a different way, such as via dedicated signal lines, a sideband channel, in a separate read response or control response from the memory, etc. As another example, in some embodiments, a controller other than memory controller 122 performs some or all of the operations. Generally, in the described embodiments, epoch counter value 314 (stored in metadata) is acquired and used to control (or influence) how a cache block is retained in cache 302 (i.e., the retention of a cache block in cache 302 is controlled based at least in part on epoch counter value 314).

Although only one threshold is described for the example in FIG. 5, in some embodiments, two or more thresholds are used. For example, in some embodiments, an upper threshold and a lower threshold are used. In these embodiments, the upper threshold can be set in proportion to a difference/reload time that is sufficiently long to warrant the configuration of a cache block to be less likely to be retained in the cache. In addition, the lower threshold can be set in proportion to a difference/reload time that is sufficiently short to warrant the configuration of the cache block to be more likely to be retained in the cache. In these embodiments, there may be middle values between the upper and lower thresholds for which the memory controller does not control (or influence) how the cache block is retained in the cache (i.e., allows the cache to handle the cache block's retention without control (or influence) from the memory controller)—or influences the retention of the cache block in a different way.

Process for Storing a Cache Block Evicted from a Cache in a Memory

Figure 6:
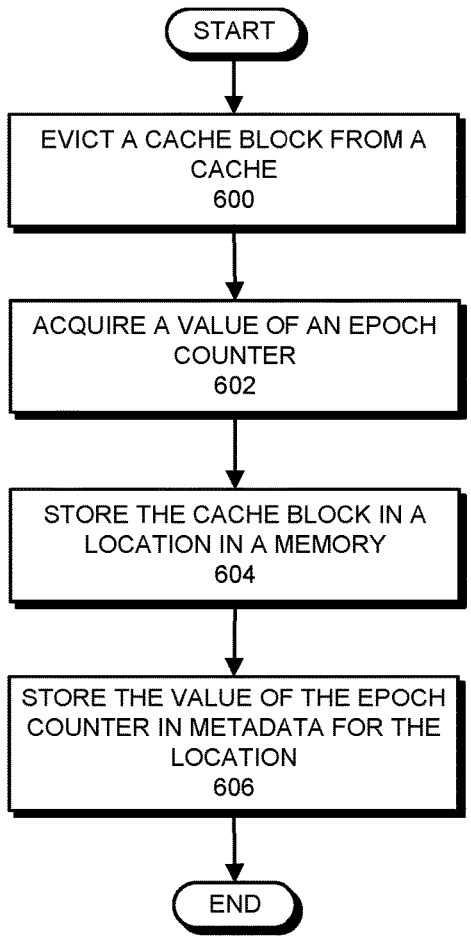
FIG. 6 presents a flowchart illustrating a process for storing a cache block evicted from a cache in a memory in accordance with some embodiments.

In the described embodiments, cache blocks evicted from a cache (e.g., cache 302) are stored in locations a memory (e.g., memory 104) and epoch counter values are stored in metadata for the locations. FIG. 6 presents a flowchart illustrating a process for storing a cache block evicted from a cache in a memory in accordance with some embodiments. FIG. 6 is presented as a general example of operations performed in some embodiments. In other embodiments, however, different operations are performed and/or operations are performed in a different order. Additionally, although certain elements are used in describing the process (e.g., a memory controller, etc.), in some embodiments, other elements perform the operations.

As can be seen in FIG. 6, the process starts when a cache block is evicted from a cache (step 600). For this operation, a cache controller determines that the cache block presently stored in the cache is to be overwritten by a new cache block. The cache block is assumed to be dirty—i.e., include a copy of data that is different than a version of the data stored in the memory—and so evicting the cache block from the cache includes writing the cache block back to the memory. The cache controller therefore communicates a request to a memory controller (e.g., memory controller 122) requesting that the cache block be written back to memory (and possibly other data, such as metadata associated with the cache block).

Upon receiving the request to write the cache block back to the memory, the memory controller prepares a memory write request for writing the cache block back to the memory. When preparing the write request, the memory controller acquires a value of an epoch counter (step 602). For example, in some embodiments, the memory controller locally keeps an epoch counter in a storage element (e.g., a register, dedicated memory elements, etc.) and thus reads the value of the epoch counter from the storage element. The memory controller generates the write request including the cache block and the epoch counter (and possibly the other data, such as metadata) and sends the write request to the memory.

Upon receiving the write request, the memory stores the cache block at a location in memory (step 604). For this operation, the memory stores the data in the cache block in the location in memory based on a memory address for the cache block. The memory also stores the epoch counter value in metadata for the location (step 606). For example, when the epoch counter is four bits, the memory writes the four bits into four bits of metadata for the location. In some embodiments, the bits into which the epoch counter value is written are repurposed ECC bits, i.e., bits in the metadata that were included within the metadata for storing ECC bits associated with data stored in the location, but which are not used for storing ECC bits.

Process for Loading a Cache Block from a Memory to a Cache

Figure 7:
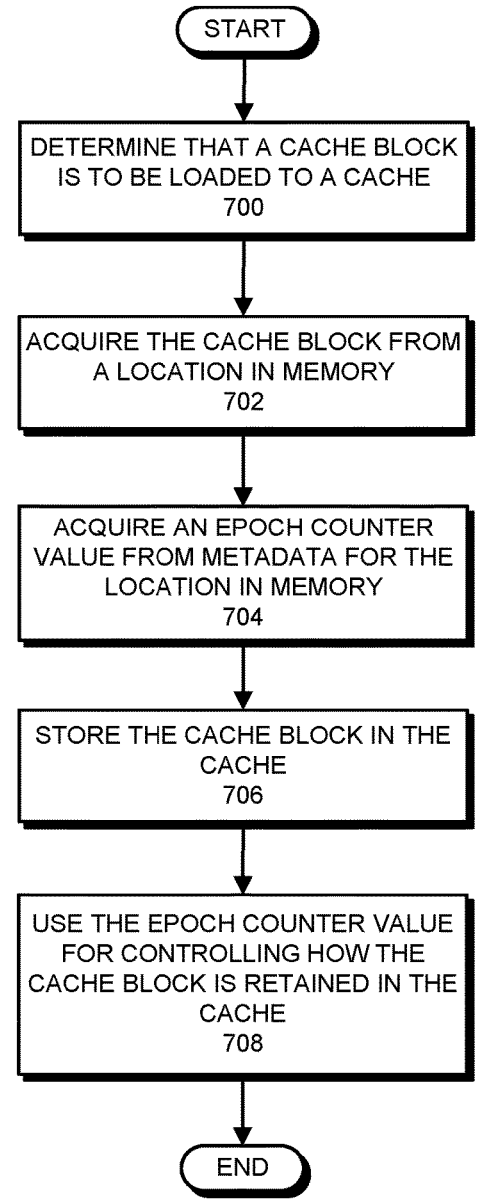
FIG. 7 presents a flowchart illustrating a process for loading a cache block from a memory to a cache in accordance with some embodiments.

In the described embodiments, cache blocks stored in locations in a memory (e.g., memory 104) are loaded to a cache (e.g., cache 302) and epoch counter values stored in metadata for the locations are used for controlling (or influencing) how the cache blocks are retained in the cache. FIG. 7 presents a flowchart illustrating a process for loading a cache block from a memory to a cache in accordance with some embodiments. FIG. 7 is presented as a general example of operations performed in some embodiments. In other embodiments, however, different operations are performed and/or operations are performed in a different order. Additionally, although certain elements are used in describing the process (e.g., a memory controller, etc.), in some embodiments, other elements perform the operations.

For the example in FIG. 7, it is assumed that the operations of FIG. 6 were previously performed. A cache block is therefore stored in a location in memory and an epoch counter value is stored in metadata for the location.

As can be seen in FIG. 7, the process starts when the memory determines that the cache block is to be loaded to the cache (step 700). For this operation, the memory receives a memory read request from a memory controller (e.g., memory controller 122) that identifies the cache block, such as via an address for the cache block. The memory then acquires the cache block from a location in the memory (step 702). The memory also acquires an epoch counter value from metadata for the location in the memory (step 704). For example, in some embodiments, the memory reads the epoch counter value from repurposed ECC bits in metadata for the location in the memory (i.e., from where the epoch counter value was previously stored). The memory next sends the cache block and the epoch counter value to the memory controller in a read response. In some embodiments, the memory also acquires and sends other data in the read response, such as other metadata.

In some embodiments, to avoid subsequent reuse of the epoch counter value stored in the metadata for the location in memory (e.g., caused by again loading the cache block to the cache without writing the cache block to memory, as with a clean eviction), the memory and/or memory controller sets the epoch counter value stored in the metadata for the location to an invalid value. For example, the memory can use a mask to write the invalid value to the epoch counter value bits in the metadata without altering other metadata bits. As long as the epoch counter value is set to the invalid value, the epoch counter value will not be used for controlling (or influencing) the retention of the cache block in the cache for future memory accesses of the cache block. Note that the epoch counter value can be reset from the invalid value to an initial value (or other value) when the cache block is next evicted from the cache and stored in the memory.

The memory controller receives the read response and stores the cache block in the cache (step 706). For this operation, the memory controller communicates the cache block to the cache and the cache stores the cache block in memory circuitry in the cache (e.g., memory circuitry 304).

The memory controller also uses the epoch counter value for controlling (or influencing) how the cache block is retained in the cache (step 708). For this operation, the memory controller uses the epoch counter value for computing a reload time for the cache block. The reload time is the difference in time between when: (1) the cache block was stored in the location in the memory after having been evicted from the cache and (2) the cache block is again loaded from the location in the memory to the cache. In other words, the reload time represents how long it took to reload the cache block to the cache after the cache block was evicted from the cache. The memory controller "controls (or influences)" how the cache block is retained in the cache by communicating information about or associated with the reload time (e.g., retention information 500) to the cache controller. The cache controller then uses the information about the reload time—and possibly other information—when setting one or more retention values for the cache block in the cache. In other words, the cache controller controls the retention of the cache block in the cache based at least in part on the epoch counter value—and possibly the other information (e.g., retention policy information, information from other entities, etc.).

Figure 8:
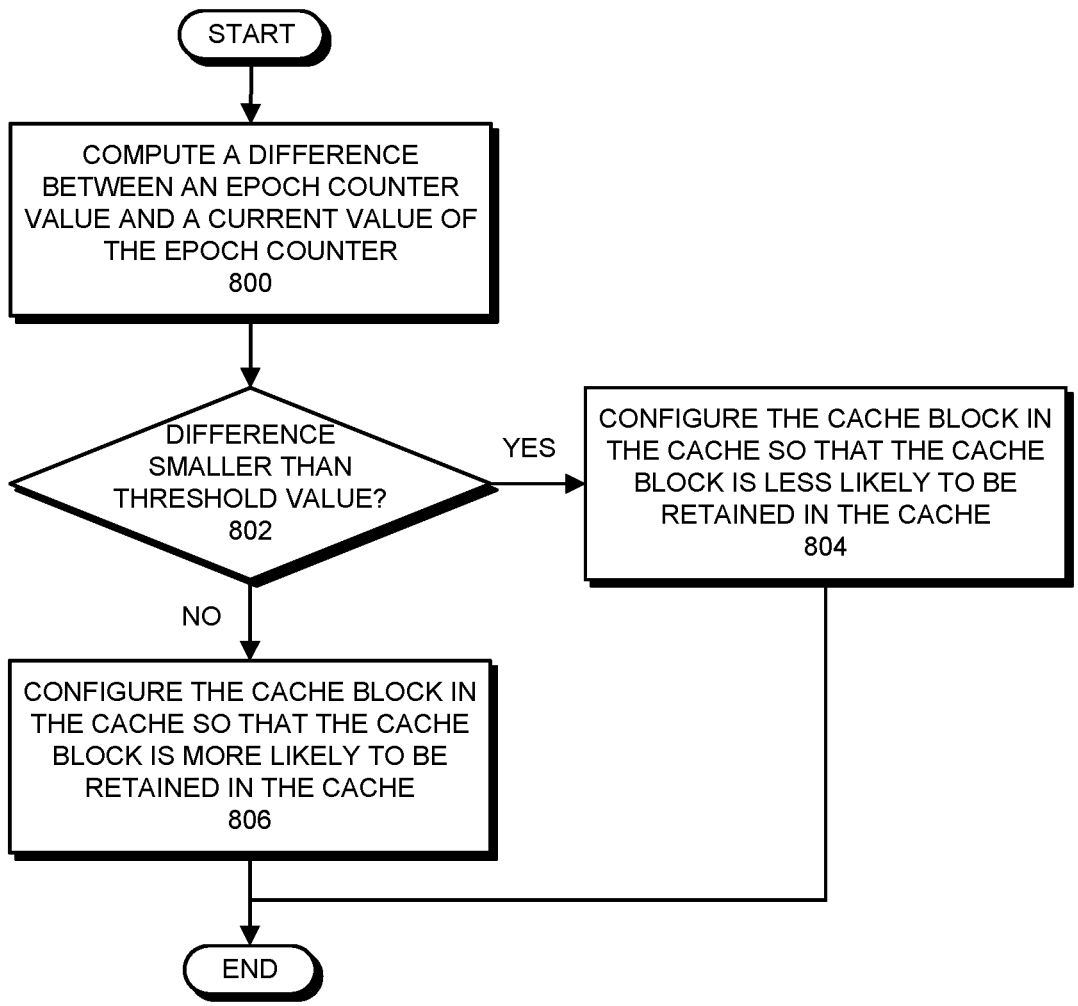
FIG. 8 presents a flowchart illustrating a process for using an epoch counter value to control the retention of a cache block in a cache in accordance with some embodiments.

FIG. 8 presents a flowchart illustrating a process for using an epoch counter value to control (or influence) the retention of a cache block in a cache in accordance with some embodiments. FIG. 8 is presented as a general example of operations performed in some embodiments. In other embodiments, however, different operations are performed and/or operations are performed in a different order. Additionally, although certain elements are used in describing the process (e.g., a memory controller, etc.), in some embodiments, other elements perform the operations. As can be seen in FIG. 8, the memory controller first computes a difference between the epoch counter value (i.e., acquired in step 704) and a current value of the epoch counter (step 800). The memory controller then determines if the difference is smaller than a threshold value (step 802). If not, i.e., if the reload time is longer, the memory controller configures the cache block so that the cache block is less likely to be retained in the cache (step 804). For example, the memory controller can communicate information about the difference (i.e., the reload time) to the cache, which then sets retention values for the cache block so that the cache block is less likely to be retained in the cache (or sets the retention values for the cache block based on the information about the difference in combination with other information such as retention policy information, etc.). For instance, assuming that an area-based retention policy in which certain regions or areas of the cache are more likely to be evicted than other areas is in use in the cache, the cache can store the cache block in an area that is more likely to be evicted. Otherwise, if the difference is smaller (or not larger) than the threshold value (step 802), i.e., if the reload time is shorter, the memory controller configures the cache block so that the cache block is more likely to be retained in the cache. Continuing the area-based retention policy example, the cache can store the cache block in an area that is less likely to be evicted.

Keeping an Epoch Counter

Figure 9:
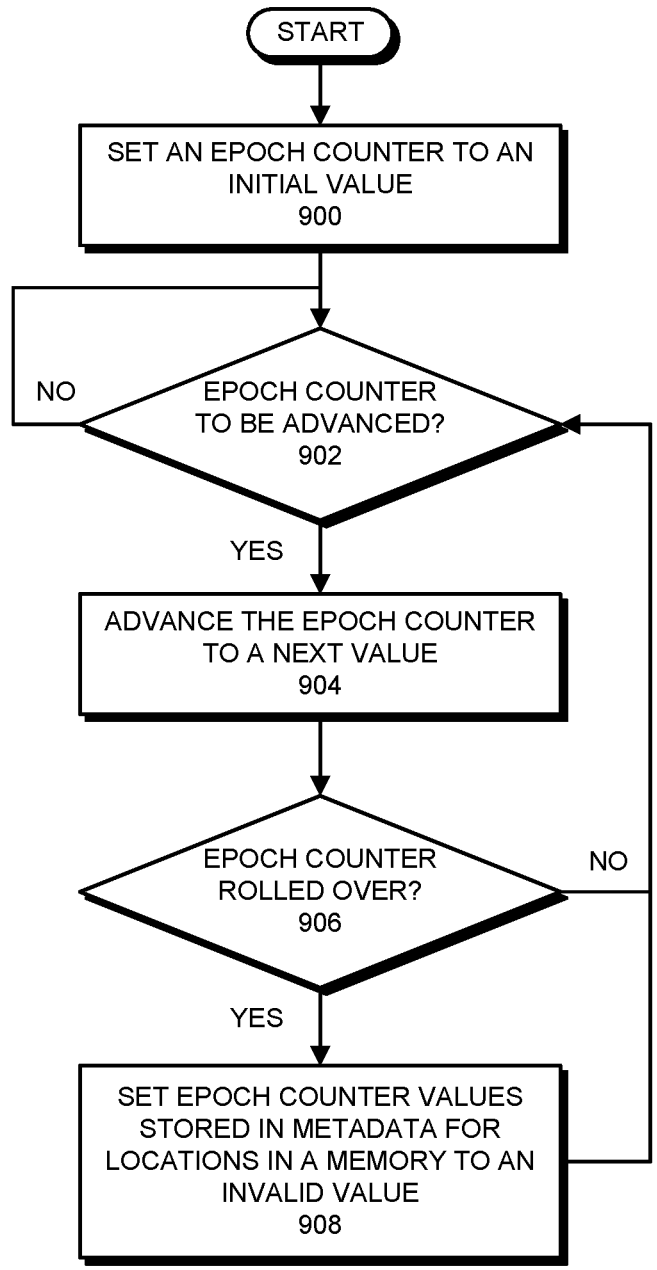
FIG. 9 presents a flowchart illustrating a process for keeping an epoch counter in accordance with some embodiments.

In the described embodiments, a memory controller (or another entity) keeps an epoch counter (e.g., epoch counter 312). Generally, keeping the epoch counter involves keeping a record of the passage (i.e., occurrence, completion, etc.) of epochs in a sequence of epochs. For example, in some embodiments, each epoch is defined as, and thus includes, T μs (T=250, 700, or another number) and keeping the epoch counter includes keeping track of the passage of T μs blocks of time. FIG. 9 presents a flowchart illustrating a process for keeping an epoch counter in accordance with some embodiments. FIG. 9 is presented as a general example of operations performed in some embodiments. In other embodiments, however, different operations are performed and/or operations are performed in a different order. Additionally, although certain elements are used in describing the process (e.g., a memory controller, etc.), in some embodiments, other elements perform the operations.

For the example in FIG. 9, the epoch counter is assumed to be three bits in length. In other words, the epoch counter includes three bits and can be stored in storage elements with sufficient space for storing three bits (e.g., a register in the memory controller, in metadata for locations in memory, etc.). In addition, the 000 value for the epoch counter is assumed to be an invalid value—and therefore to indicate the epoch counter is itself invalid. Values from 001-111 are valid, however, and can therefore be used to represent respective epochs. It is further assumed that epochs are defined based on time, with each epoch being T μs in length.

As can be seen in FIG. 9, the process starts when the memory controller sets the epoch counter to an initial value (step 900). For this operation, the memory controller sets the epoch counter to a lowest valid value for the epoch counter, at startup and/or at another time (e.g., when one or more events occur, when resuming from a low power state, when requested to by a core or another entity, upon commencing or resuming the use of the epoch counter, etc.). Using the three bit epoch counter example, the initial value can be 001. By setting the epoch counter to the initial value, the memory controller readies the epoch counter for being used for keeping track of the passage of epochs.

The memory controller then determines whether the epoch counter is to be advanced (step 902). For this operation, the memory controller monitors the passage of time to determine whether (or not) T μs have passed since the epoch counter was set to the initial value. For example, the memory controller can periodically poll a system clock, wait for an overflow in a counter, wait for a signal from a timing circuit, etc. Until T μs have passed, the memory controller determines that the epoch counter is not to be advanced and waits, i.e., returns to step 902, leaving the epoch counter unchanged.

When the epoch counter is to be advanced (step 902), the memory controller advances the epoch counter to a next value (step 904). For this operation, the memory controller detects that T μs have passed since the epoch counter was set to the initial value and thus a new epoch has been entered. The memory controller therefore advances the epoch counter to a next value for the epoch counter. In other words, the memory controller records the completion of a given epoch by transitioning the epoch counter to a next epoch counter value. Continuing the three bit epoch counter example and recalling that the epoch counter is set to 001, the memory controller can increment the epoch counter by setting the epoch counter to the next binary numerical value, 010. In some embodiments, however, the epoch counter is not advanced through binary values (which requires the change of numerous bits for transitioning between certain binary values) but instead uses Grey codes or other forms of value encoding in the epoch counter. In these embodiments, advancing the epoch counter involves setting the epoch counter to a next value in accordance with the encoding scheme. Generally, for the operation in step 904, the memory controller changes the value of the epoch counter in a way that identifies that the particular epoch has completed and a next epoch has begun.

The memory controller then determines whether the epoch counter has rolled over (step 906). For this operation, the epoch counter is assumed to return to the initial value from a highest value for the epoch counter. Continuing the three bit epoch counter example, this means that the epoch counter rolls over to 001 from 111 (noting that the 000 value is reserved, as described above). The memory controller therefore determines if advancing the epoch counter to the next value caused the epoch counter to return to the initial value from a highest value for the epoch counter. In this case, the epoch counter is set to 010 and thus has not rolled over. The memory controller therefore returns to step 902 to await the next advancement in the epoch counter.

The memory controller continues in this way, advancing the epoch counter and checking the epoch counter for rollover until the epoch counter has been advanced sufficiently to roll over (steps 904-906). When (and if) the epoch counter rolls over (step 906), the memory controller sets epoch counter values stored in metadata for locations in the memory to an invalid value (step 908). For this operation, continuing the three bit epoch counter example, the memory controller sets existing epoch counter values in metadata for all locations in memory (or at least for locations in memory having epoch counter values stored in their metadata) to the invalid value 000. The memory controller does this because the epoch counter has rolled over from the highest value to the lowest value and handling the computation of differences (as described for FIG. 8) in view of the rollover introduces significant complexity. In other words, handling epoch counter values that have been stored in memory for longer than one rollover cycle (and possibly for multiple rollover cycles) requires additional recordkeeping that is relatively complex. In some embodiments, however, epoch counter values stored in metadata in memory are not set to invalid values as described for step 908, but instead are managed through one or more rollovers of the epoch counter.

In some embodiments, a refresh mechanism is used for setting the epoch counter values in metadata for locations in the memory to the invalid value following a rollover. For example, assuming that the memory is implemented in DRAM circuitry, which requires regular refreshes to avoid stored data becoming unreliable, the epoch counter values in metadata can be set to the invalid value as locations in memory and the associated metadata are refreshed via periodic DRAM refresh operations. In some cases, the refresh is slow enough that certain epoch counter values are unintentionally set to the invalid value (i.e., those epoch counter values set soon after the rollover of the epoch counter), but this is not a correctness issue, as epoch information is not necessary for the correct operation of the memory or cache. To mitigate the issue of slow refreshes invalidating useful epoch counter values in metadata, in some embodiments, the reset of epoch counter values stored in memory using DRAM refresh operations is initiated as the epoch counter approaches rollover (i.e., but has not yet rolled over). Continuing the three-bit epoch counter example, the reset of epoch counter values stored in metadata in the memory may be initiated when the current epoch counter reaches a specified pre-rollover value such as 110—prior to the rollover after 111. In some of these embodiments, a bit mask is used for ensuring that the epoch counter values in the metadata are set to the invalid value while other data in the metadata remains as-is.

Although a particular definition of an epoch is used for the example in FIG. 9, in some embodiments, epochs are differently defined. For example, in some embodiments, epochs are defined not based on the passage of time, but instead based on the occurrence of specified events. For instance, a number of memory accesses, cache block evictions, loads, or reloads, etc. As another example, epochs can be defined based on two or more factors, metrics, etc., such as based on the passage of time and memory accesses. As yet another example, the definition of an epoch can be dynamic and epochs can be defined based at least in part on software executing on cores, workload profiles, memory access profiles, cache size and availability, average residence time for cache blocks in the cache, amount of memory in use, etc. Generally, in the described embodiments, any operational metric or combination thereof can be used for defining epochs.

Although the example of the epoch counter for FIG. 9 has three bits, in some embodiments, the epoch counter includes a different number of bits. In some embodiments, the number of bits in the epoch counter is chosen in consideration of factors such as the number of available bits in the metadata for locations in memory, the number of ECC bits in metadata for locations in memory that can be repurposed for storing epoch counter values, the amount of effort involved in communicating epoch counter values to and from the memory, etc.

As briefly described above, although steps 906-908 are described as occurring when the epoch counter rolls over, in some embodiments, the epoch counters are set to an invalid value as the epoch counter approaches rollover. In other words, in these embodiments, the memory controller sets epoch counter values stored in metadata for locations in the memory to an invalid value when the epoch counter reaches a specified pre-rollover value close to a highest value for the epoch counter, when the epoch counter reaches a specified proportion of the highest value (e.g., 90% of the highest value), etc. In these embodiments, continuing the three bit epoch counter example, the memory controller sets existing epoch counter values in metadata for all locations in memory (or at least for locations in memory having epoch counter values stored in their metadata) to the invalid value 000 when the epoch counter reaching 110, 101, or another value close to the highest value of 111.

Halting and Resuming the Use of Epoch Counter Values

Figure 10:
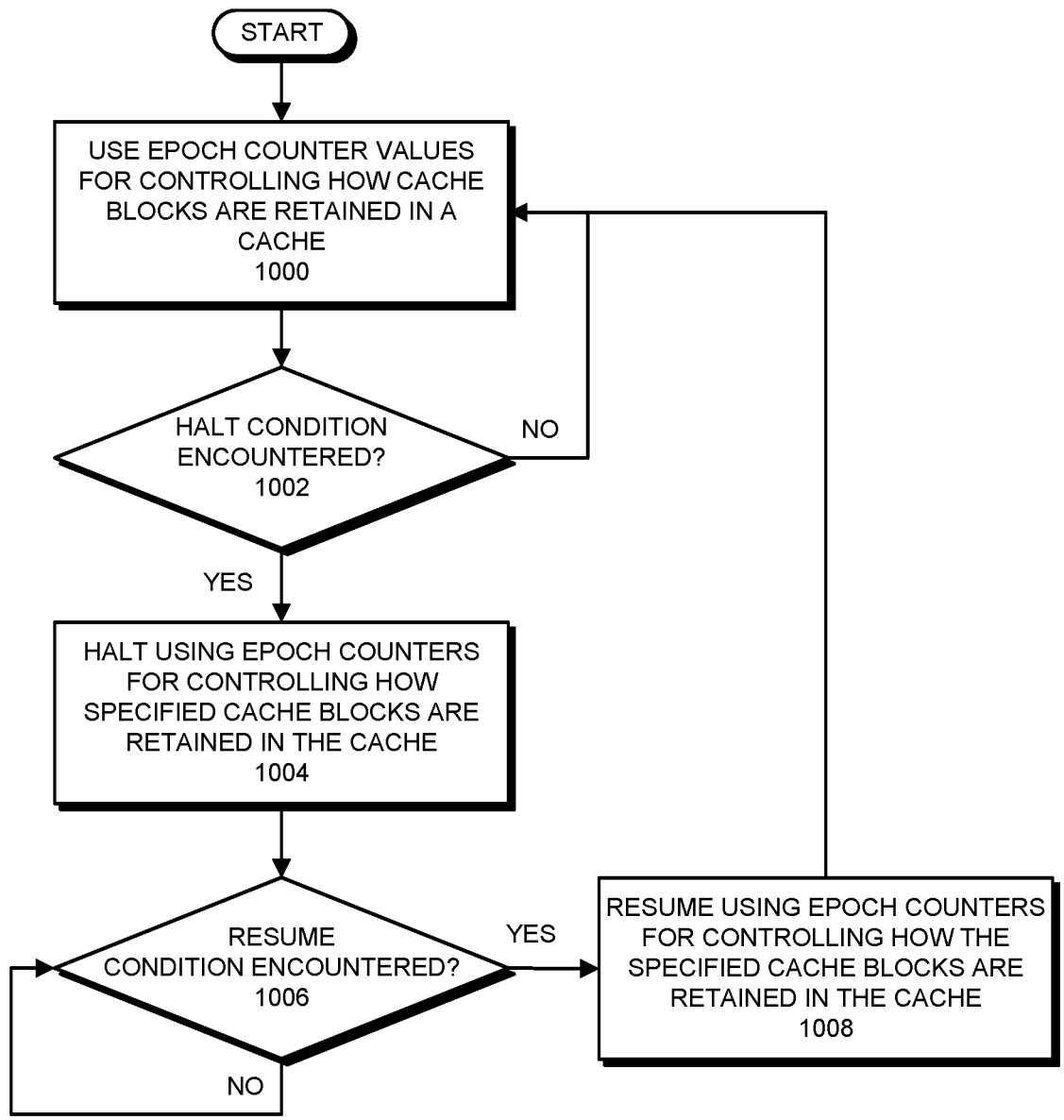
FIG. 10 presents a flowchart illustrating a process for halting and resuming the use of epoch counter values in accordance with some embodiments.

In some embodiments, the use of epoch counter values for controlling (or influencing) the retention of cache blocks in the cache memory can be halted and resumed (i.e., paused and restarted, disabled and (re)enabled, etc.). For example, in some embodiments, the use of epoch counter values can be halted for specified cache blocks upon encountering a halt condition. In these embodiments, the "specified" cache blocks include individual cache blocks, groups of cache blocks, and/or all cache blocks. Once halted, at least some of the operations for storing epoch counter values in metadata for locations in a memory and/or using epoch counter values for controlling (or influencing) retention of the specified cache blocks are stopped. These operations may then be resumed upon encountering a resume condition. FIG. 10 presents a flowchart illustrating a process for halting and resuming the use of epoch counter values in accordance with some embodiments. FIG. 10 is presented as a general example of operations performed in some embodiments. In other embodiments, however, different operations are performed and/or operations are performed in a different order. Additionally, although certain elements are used in describing the process (e.g., a controller, etc.), in some embodiments, other elements perform the operations.

As can be seen in FIG. 10, the process starts when a controller (e.g., controller 122) is using epoch counter values for controlling (or influencing) how cache blocks are retained in a cache (step 1000). For this operation, the controller stores epoch counter values in metadata for locations in memory for evicted cache blocks and uses the epoch counter values from the metadata for controlling (or influencing) how the cache blocks are to be retained in the cache when the cache blocks are reloaded to the cache. A number of examples of such operations are described above for FIGS. 6-9.

The controller then determines whether a halt condition has been encountered (step 1002). For this operation, while using epoch counter values for controlling (or influencing) the retention of specified cache blocks in the cache, the controller encounters at least one condition under which the use of the epoch counter values is to be halted. For example, in some embodiments, the controller monitors the performance of the cache while using epoch counter values and encounters/detects a halt condition when the performance falls below a given threshold. For instance, when the rate of eviction of cache blocks and/or reloading cache blocks is higher than a threshold, the average reload time is lower than a threshold, etc. In these embodiments, the performance-based halt condition encountered by the controller applies to all cache blocks (or a subset thereof)—and thus the "specified cache blocks" include all of the cache blocks (or the subset thereof). As another example, in some embodiments, a halt condition can be encountered when another entity in electronic device requests the halt of the use of the epoch counter values for controlling (or influencing) the retention of specified cache blocks in the cache. Generally, a halt condition is a condition in view of which the use of epoch counter values for controlling (or influencing) the retention of specified cache blocks in the cache is to be stopped. If no halt condition is encountered (step 1002), the controller continues to use epoch counter values for controlling (or influencing) how cache blocks are retained in a cache (step 1000).

When a halt condition is encountered (step 1002), the controller halts the use of epoch counter values for controlling (or influencing) how specified cache blocks are retained in a cache (step 1004). For this operation, the controller stops performing one or more operations associated with using the epoch counter values for the specified cache blocks. For example, in some embodiments, the controller entirely stops using epoch counter values—and thus the "specified" cache blocks include all cache blocks. In these embodiments, the controller does not store epoch counter values in metadata for locations in memory (as described for FIGS. 3-4 and 6) and/or use epoch counter values from metadata for controlling (or influencing) how cache blocks are retained in the cache (as described for FIGS. 5 and 7-8). In these embodiments, the controller may also stop keeping track of the epoch counter (as described for FIG. 9). As another example, in some embodiments, the controller stores epoch counter values in metadata for locations in memory for cache blocks, but does not use epoch counter values from the metadata for controlling (or influencing) how the specified cache blocks are retained in the cache (i.e., may not generate and/or communicate retention information to the cache, etc. for the specified cache blocks).

While the use of epoch counter values is halted, the controller monitors for a resume condition (step 1006). For example, in some embodiments, the controller monitors the performance of the cache while the use of epoch counter values is halted and detects a resume condition when the performance falls below or exceeds a given threshold. For instance, when the rate of eviction of cache blocks and/or reloading cache blocks is higher than a threshold, the average reload time is lower than a threshold, etc. In these embodiments, the resume condition encountered by the controller applies to all cache blocks (or a subset thereof)—and thus the "specified cache blocks" include all of the cache blocks (or the subset thereof). As another example, in some embodiments, a resume condition can be encountered when another entity in electronic device requests the resumption of the use of the epoch counter values for controlling (or influencing) the retention of specified cache blocks in the cache. Generally, a resume condition is a condition under which the use of epoch counter values for controlling (or influencing) the retention of specified cache blocks in the cache is to be resumed after being halted. If no resume condition is encountered, the controller does not resume using epoch counter values for controlling (or influencing) how cache blocks are retained in a cache (step 1006). In other words, the controller continues not to use epoch counter values as described for step 1004.

When a resume condition is encountered (step 1006), the controller resumes the use of epoch counter values for controlling (or influencing) how specified cache blocks are retained in a cache (step 1008). For this operation, the controller performs one or more operations for resuming the use of the epoch counter values. For example, in some embodiments in which the controller entirely stopped using epoch counter values (step 1004), the controller resumes using epoch counter values. The controller therefore resumes storing epoch counter values in metadata for locations in memory (as described for FIGS. 3-4 and 6) and using epoch counter values from metadata for controlling (or influencing) how cache blocks are retained in the cache (as described for FIGS. 5 and 7-8). The controller may also resume keeping track of the epoch counter (as described for FIG. 9). The controller then returns to step 1000 to use epoch counter values for controlling (or influencing) how cache blocks are retained in a cache.

Although a controller is used for the example in FIG. 10, in some embodiments, other entities can encounter halt conditions and halt the use of the epoch counter values for controlling (or influencing) the retention of specified cache blocks in the cache. For example, in some embodiments, a cache can halt the use of epoch values for controlling (or influencing) the retention of an individual cache block (i.e., the "specified cache block") upon encountering an access of the individual cache block (i.e., the "halt condition"). In these embodiments, the cache initially configures a given cache block for a retention policy in use in the cache based on input from the controller (e.g., retention information 500). When the cache block is subsequently accessed (i.e., accessed when the cache block is already stored in the cache), however, the cache reverts to managing the cache block in accordance with the retention policy. For instance, when the retention policy is a recently used retention policy and the cache set usage information for the cache block to least recently used based (LRU) on retention information received from the controller, the cache can update the usage information to most recently used (MRU) upon the cache block being subsequently accessed. By updating the usage information from LRU, the cache halts the use of the epoch counter value for controlling (or influencing) the retention of the cache block in the cache—and commences managing the cache block in accordance with the retention policy alone.

Although it is assumed that epoch counter values are already in use for the example in FIG. 10, in some embodiments, epoch counter values are not initially in use and the use of epoch counter values is commenced at a desired time. For example, a controller can monitor cache performance (e.g., eviction rate, evicted cache block addresses, etc.) and can determine to start using epoch counter values when the cache performance falls below (or exceeds) a given cache performance threshold. Generally, once epoch counter values are in use in the electronic device, the use of epoch counter values for controlling (or influencing) the retention of cache blocks in the cache memory can be halted (and possibly resumed) as described for FIG. 10.

In some embodiments, the controller (or another entity) periodically halts the use of epoch counter values such as shown in FIG. 10 to compare cache performance metrics with and without the use of the epoch counter values—to ensure that using epoch counter values is having a positive impact on cache performance. In these embodiments, the controller may not resume the use of epoch counter values when the cache performance is not sufficiently improved using the epoch counter values.

Epoch Counter Values for Cache Blocks that are not Written Back to Memory

For many of the examples herein, epoch counter values are stored in metadata for locations in memory as cache blocks are stored in the locations. In other words, for these examples, only when cache blocks are written back to memory can the cache blocks benefit from the use of epoch counter values to compute their reload times (and thus control (or influence) their retention in the cache). In some embodiments, however, cache blocks that are not written back to memory can have epoch counter values stored in metadata for the associated locations in memory. For example, epoch counter values can be stored in metadata for "clean" cache blocks, i.e., cache blocks for which the data matches the corresponding data already stored in memory and which are simply overwritten in the cache. In other words, despite clean cache blocks not being written back to the memory, epoch counter values are stored in metadata for some or all of the clean cache blocks. For example, an epoch counter value can be stored in metadata for a location in memory associated with every Mth evicted clean cache block (where M=20, 100, or another number). In these embodiments, the memory controller, the cache, and/or other entities perform operations for communicating the eviction of a cache block and/or storing the epoch counter value in the metadata in the memory. That is, the above-described processes are adjusted to enable the acquisition and storage of the epoch counter value in memory given that there is no write back of the evicted cache block.

In some embodiments, at least one electronic device (e.g., electronic device 100, etc.) or some portion thereof uses code and/or data stored on a non-transitory computer-readable storage medium to perform some or all of the operations described herein. More specifically, the at least one electronic device reads code and/or data from the computer-readable storage medium and executes the code and/or uses the data when performing the described operations. A computer-readable storage medium can be any device, medium, or combination thereof that stores code and/or data for use by an electronic device. For example, the computer-readable storage medium can include, but is not limited to, volatile and/or non-volatile memory, including flash memory, random access memory (e.g., DDR5 DRAM, SRAM, eDRAM, etc.), non-volatile RAM (e.g., phase change memory, ferroelectric random access memory, spin-transfer torque random access memory, magnetoresistive random access memory, etc.), read-only memory (ROM), and/or magnetic or optical storage mediums (e.g., disk drives, magnetic tape, CDs, DVDs, etc.).

In some embodiments, one or more hardware modules perform the operations described herein. For example, the hardware modules can include, but are not limited to, one or more central processing units (CPUs)/CPU cores, graphics processing units (GPUs)/GPU cores, application-specific integrated circuit (ASIC) chips, field-programmable gate arrays (FPGAs), compressors or encoders, encryption functional blocks, compute units, embedded processors, accelerated processing units (APUs), controllers, requesters, completers, network communication links, and/or other functional blocks. When circuitry (e.g., integrated circuit elements, discrete circuit elements, etc.) in such hardware modules is activated, the circuitry performs some or all of the operations. In some embodiments, the hardware modules include general purpose circuitry such as execution pipelines, compute or processing units, etc. that, upon executing instructions (e.g., program code, firmware, etc.), performs the operations. In some embodiments, the hardware modules include purpose-specific or dedicated circuitry that performs the operations "in hardware" and without executing instructions.

In some embodiments, a data structure representative of some or all of the functional blocks and circuit elements described herein (e.g., electronic device 100 or some portion thereof) is stored on a non-transitory computer-readable storage medium that includes a database or other data structure which can be read by an electronic device and used, directly or indirectly, to fabricate hardware including the functional blocks and circuit elements. For example, the data structure may be a behavioral-level description or register-transfer level (RTL) description of the hardware functionality in a high-level design language (HDL) such as Verilog or VHDL. The description may be read by a synthesis tool which may synthesize the description to produce a netlist including a list of transistors/circuit elements from a synthesis library that represent the functionality of the hardware including the above-described functional blocks and circuit elements. The netlist may then be placed and routed to produce a data set describing geometric shapes to be applied to masks. The masks may then be used in various semiconductor fabrication steps to produce a semiconductor circuit or circuits (e.g., integrated circuits) corresponding to the above-described functional blocks and circuit elements. Alternatively, the database on the computer accessible storage medium may be the netlist (with or without the synthesis library) or the data set, as desired, or Graphic Data System (GDS) II data.

In this description, variables or unspecified values (i.e., general descriptions of values without particular instances of the values) are represented by letters such as N, T, and X As used herein, despite possibly using similar letters in different locations in this description, the variables and unspecified values in each case are not necessarily the same, i.e., there may be different variable amounts and values intended for some or all of the general variables and unspecified values. In other words, particular instances of N and any other letters used to represent variables and unspecified values in this description are not necessarily related to one another.

The expression "et cetera" or "etc." as used herein is intended to present an and/or case, i.e., the equivalent of "at least one of" the elements in a list with which the etc. is associated. For example, in the statement "the electronic device performs a first operation, a second operation, etc.," the electronic device performs at least one of the first operation, the second operation, and other operations. In addition, the elements in a list associated with an etc. are merely examples from among a set of examples—and at least some of the examples may not appear in some embodiments.

The foregoing descriptions of embodiments have been presented only for purposes of illustration and description. They are not intended to be exhaustive or to limit the embodiments to the forms disclosed. Accordingly, many modifications and variations will be apparent to practitioners skilled in the art. Additionally, the above disclosure is not intended to limit the embodiments. The scope of the embodiments is defined by the appended claims.

What is claimed is:

1. An electronic device, comprising:
a cache;
a memory; and
a controller, the controller configured to:
    store an epoch counter value in metadata for a location in the memory when a cache block evicted from the cache is stored in the location, the epoch counter value identifying a presently-occurring epoch in a sequence of epochs for the electronic device; and
    control how the cache block is retained in the cache based at least in part on the epoch counter value when the cache block is subsequently retrieved from the location and stored in the cache.

2. The electronic device of claim 1, wherein, for controlling how the cache block is retained in the cache based at least in part on the epoch counter value, the controller is configured to:
    compute a difference between the epoch counter value and a current epoch counter value;
    cause the cache to configure the cache block to be more likely to be retained in the cache when the difference is smaller than a threshold value; and
    cause the cache to configure the cache block to be less likely to be retained in the cache when the difference is larger than a threshold value.

3. The electronic device of claim 2, wherein:
the cache block is retained in the cache in accordance with a retention policy; and
the cache configures the cache block so that the cache block is more likely or less likely to be retained in the cache using one or more retention policy settings.

4. The electronic device of claim 2, wherein the threshold value is set based on an average reload time for cache blocks in the cache.

5. The electronic device of claim 1, wherein the controller is further configured to:
    advance an epoch counter to a next epoch counter value at one or more specified times or upon the occurrence of one or more specified events.

6. The electronic device of claim 5, wherein:
the epoch counter includes a given number of bits;
when advancing the epoch counter to a next epoch counter value, the controller is configured to roll over the epoch counter by returning the epoch counter to an initial value from a highest value for the bits; and
a rate at which the controller advances the epoch counter is set based on a specified time between consecutive rollovers of the epoch counter.

7. The electronic device of claim 6, wherein the controller is further configured to:
    upon rolling over the epoch counter or reaching a specified pre-rollover value of the epoch counter, reset epoch counter values stored in metadata for locations in the memory.

8. The electronic device of claim 1, wherein the controller and/or the cache are further configured to:
    determine that a halt condition has been encountered for specified cache blocks; and
    halt using epoch counter values to control how the specified cache blocks are retained in the cache.

9. The electronic device of claim 1, wherein the controller is further configured to:
    store an other epoch counter value in metadata for an other location associated with an other cache block in the memory, the other cache block having been evicted from the cache without being stored in the memory; and
    control how the other cache block is retained in the cache based at least in part on the other epoch counter value when the other cache block is subsequently retrieved from the memory and stored in the cache.

10. The electronic device of claim 1, wherein the memory is configured to:
    upon retrieving the cache block from the location, set the epoch counter value in the metadata to an invalid value that indicates no epoch counter value is stored in the metadata.

11. A method for retaining cache blocks in a cache in an electronic device that includes the cache and a memory, the method comprising:
    storing an epoch counter value in metadata for a location in the memory when a cache block evicted from the cache is stored in the location, the epoch counter value identifying a presently-occurring epoch in a sequence of epochs for the electronic device; and controlling how the cache block is retained in the cache based at least in part on the epoch counter value when the cache block is subsequently retrieved from the location and stored in the cache.

12. The method of claim 11, wherein controlling how the cache block is retained in the cache based at least in part on the epoch counter value includes:
    configuring the cache block to be more likely to be retained in the cache when a difference between the epoch counter value and a current epoch counter value is smaller than a threshold value; and
    configuring the cache block to be less likely to be retained in the cache when the difference is larger than a threshold value.

13. The method of claim 12, wherein the cache block is retained in the cache in accordance with a retention policy, and configuring the cache block so that the cache block is more likely or less likely to be retained in the cache includes using one or more retention policy settings.

14. The method of claim 12, further comprising setting the threshold value based on an average reload time for cache blocks in the cache.

15. The method of claim 11, further comprising advancing an epoch counter to a next epoch counter value at one or more specified times or upon the occurrence of one or more specified events.

16. The method of claim 15, wherein:
    the epoch counter includes a given number of bits;
    advancing the epoch counter to a next epoch counter value includes rolling over the epoch counter by returning the epoch counter to an initial value from a highest value for the bits; and
    the method further comprises setting a rate for advancing the epoch counter based on a specified time between consecutive roll-overs of the epoch counter.

17. The method of claim 16, wherein the method further comprises resetting epoch counter values stored in metadata for locations in the memory upon rolling over the epoch counter or reaching a specified pre-rollover value of the epoch counter.

18. The method of claim 11, wherein the method further comprises halting using epoch counter values to control how specified cache blocks are retained in the cache upon determining that a halt condition has been encountered for the specified cache blocks.

19. The method of claim 11, wherein the method further comprises:
    storing an other epoch counter value in metadata for an other location associated with an other cache block in the memory, the other cache block having been evicted from the cache without being stored in the memory; and
    controlling how the other cache block is retained in the cache based at least in part on the other epoch counter value when the other cache block is subsequently retrieved from the memory and stored in the cache.

20. The method of claim 11, wherein the method further comprises:
    when retrieving the cache block from the location, setting the epoch counter value in the metadata to an invalid value that indicates no epoch counter value is stored in the metadata.

* * * * *